(12) United States Patent
Jones

(10) Patent No.: US 8,909,140 B2
(45) Date of Patent: Dec. 9, 2014

(54) TRANSMITTER

(75) Inventor: Steve Jones, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 314 days.

(21) Appl. No.: 13/462,647

(22) Filed: May 2, 2012

(65) Prior Publication Data

US 2013/0295844 A1 Nov. 7, 2013

(51) Int. Cl.
*H04B 7/00* (2006.01)

(52) U.S. Cl.
USPC ......................................... 455/41.1

(58) Field of Classification Search
CPC ........................................ H04B 5/00
USPC ........................................ 455/41.1
See application file for complete search history.

(56) References Cited

U.S. PATENT DOCUMENTS

| | | | |
|---|---|---|---|
| 8,686,887 B2* | 4/2014 | Savoj | 341/144 |
| 2008/0090519 A1* | 4/2008 | Rofougaran et al. | 455/41.1 |
| 2010/0021176 A1* | 1/2010 | Holcombe et al. | 398/115 |
| 2013/0003892 A1* | 1/2013 | McFarthing | 375/298 |
| 2013/0109304 A1* | 5/2013 | Marcu et al. | 455/41.1 |

* cited by examiner

*Primary Examiner* — April G Gonzales
(74) *Attorney, Agent, or Firm* — Fulbright & Jaworski LLP

(57) ABSTRACT

Systems and methods providing a transmitter for transmitting signals in a near-field communication (NFC) frequency band are disclosed. According to embodiments, a transmitter for transmitting signals in a near-field communication frequency band comprises an antenna, a first current source for generating a first current to excite the antenna, a first detector for detecting a first voltage at an output of the first current source, and means for reducing the current output by the first current source if the detected first voltage exceeds a first predefined threshold. An integrated circuit of embodiments may comprise the foregoing transmitter. A transmitter configuration of embodiments, including means for reducing the current, provides for limited distortion in the transmitted signal and reducing the risk of components in the transmitter being damaged.

18 Claims, 2 Drawing Sheets

TRANSMITTER

TECHNICAL FIELD

This invention relates to a transmitter and, in particular, to a transmitter suitable for transmitting signals in a near-field communication (NFC) frequency band.

BACKGROUND OF THE INVENTION

Mobile communication devices, such as mobile telephones, smart phones, personal digital assistants (PDA) and laptop computers are often provided with means for communicating wirelessly with other such devices, and with other communication devices.

One such means of communicating wirelessly uses near field communication (NFC). Near field communication is the name given to the communication of data over a distance of less than around 5 cm. NFC operates at a frequency of 13.56 MHz, and allows data to be transferred at rates from 106 kbit/s to 848 kbit/s. Data is transmitted between an NFC initiator and an NFC target. The initiator (often referred to as a reader) is a powered device that emits a radio frequency (RF) field. The target need not be powered, and typically takes the form of a key fob, a card or a mobile telephone. When an NFC target is moved into the RF field emitted by the initiator, the target is powered by the RF field, and emits a signal which is detected by the initiator.

An example of how NFC technology is used is in a security system for securing access to a restricted area or building. An NFC initiator is installed in a unit positioned near to, say, a restricted entrance or door. The initiator generates a radio frequency (RF) field. When a target, which may take the form of a key card or a key fob, is moved into the RF field generated by the initiator, the target, which is powered by the RF field, emits a signal which is detected by the initiator unit. If the security system recognises the returned signal as one from a card authorised to access the entrance or door, then it sends a signal to another part of the security system to grant access to the restricted area, for example by unlocking the door or deactivating an alarm system.

In a known device, an NFC target is installed in a mobile telephone. Therefore, when the mobile telephone is moved near to an NFC initiator, such that the target is moved within the RF field emitted by the initiator, the target is detected and emits a return signal to the initiator. In another known device, an NFC initiator is installed in a mobile telephone, and is capable of detecting NFC targets that are within an RF field emitted therefrom. Of course, a mobile telephone may be provided with both an NFC target and an NFC initiator.

An NFC initiator includes an antenna which must be driven in order for it to emit signals. An existing NFC antenna driver uses switching amplifiers to generate signals at the required frequency of 13.56 MHz. However, such known drivers generate harmonics at integer multiples of the desired frequency, in addition to the signal at the desired frequency. The higher frequency harmonics have frequencies equal to or similar to those of signals used by mobile telephone receivers. Therefore, if such a known NFC transmitter is installed in a mobile telephone, the higher frequency harmonics generated in addition to the signal at the desired frequency are likely to interfere with signals received by the mobile telephone receiver. If the mobile telephone is also installed with an NFC receiver, then signals transmitted by the mobile telephone, which are of the same or similar frequency as those received by the NFC receiver, are likely to interfere with received NFC signals. Additionally or alternatively, cross modulation may occur between signals transmitted by the mobile telephone and signals received or transmitted by the NFC receiver and/or transmitter.

Interference between the NFC signals and the mobile telephone signals can cause undesirable noise, for example during a telephone conversation. If the interference is too great, then a mobile telephone call may be dropped. Similarly, if the mobile telephone signal interferes with the NFC receiver (that is the NFC target), then the NFC initiator may not be unable to detect a response from an NFC target.

Furthermore, particular harmonics of signals transmitted by an NFC transmitter, in particular the sixth, seventh and eighth harmonics, have frequencies falling within the frequency modulation (FM) frequency band. Therefore, mobile telephone devices that have NFC transmitters and FM receivers built in might suffer interference problems when transmitted NFC signals interfere with received FM signals.

BRIEF SUMMARY OF THE INVENTION

According to a first aspect of the present invention a transmitter for transmitting signals in a near-field communication (NFC) frequency band comprises an antenna; a first current source for generating a first current to excite the antenna; a first detector for detecting a first voltage at an output of the first current source; and means for reducing the current output by the first current source if the detected first voltage exceeds a first predefined threshold. An advantage of the transmitter including means for reducing the current is that distortion in the transmitted signal can be limited, and the risk of components in the transmitter being damaged can be reduced.

According to a second aspect of the present invention, an integrated circuit comprises a transmitter according to the first aspect.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
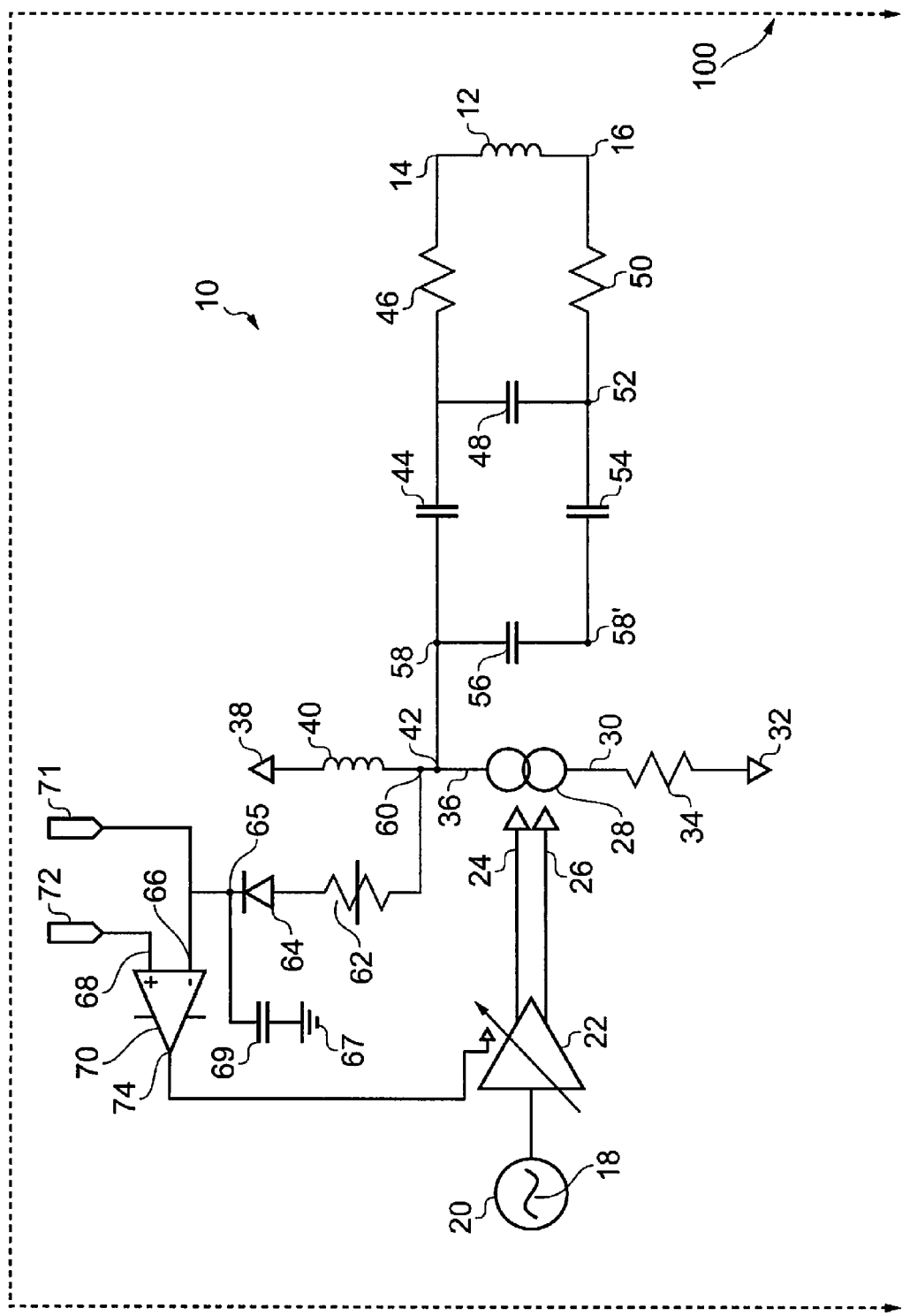
FIG. 1 is a circuit diagram showing part of a circuit having an antenna and an NFC driver.

Referring to the drawings, FIG. 1 shows a circuit 10 which forms a near field communication (NFC) driver. The circuit 10 forms part of a larger circuit, shown by dashed line 100, and which will be discussed with reference to FIG. 2. The circuit 10 includes an antenna 12 which is formed of a plurality of coil turns. In the drawings of this specification, the antenna 12 is shown to have four turns. However, one skilled in the field of antenna design would appreciate that the antenna 12 may be formed of a coil having any number of turns.

The antenna 12 has a first end 14 and a second end 16. The ends 14, 16 of the antenna 12 are connected to circuitry which will be discussed in greater detail below.

A device in which the circuit 10 is installed is capable of operating in a transmit mode and in a receive mode. In the receive mode, the antenna 12 receives a signal in an NFC frequency band, and the signal is demodulated by demodulation means (not shown) via circuitry (not shown). This invention relates to the circuit 10 in a transmit mode, in which a signal is transmitted from the antenna 12.

A carrier signal 18, having a frequency of 13.56 MHz, is generated by a signal generator 20. In transmit mode, the carrier signal 18 is modulated with data to be transmitted by the antenna.

The carrier signal 18 is input into a variable amplifier 22. An amplified version of the carrier signal 18 is output from the variable amplifier 22 via a first output 24 and a second output 26. The first output 24 is an amplified version of the original drive (i.e. input) signal, and the second output 26 is an output driver bias, which is proportional to the drive signal level. Those skilled in the art will appreciate that the output driver bias 26 is not important in the context of the present invention, and is shown in FIG. 1 for completeness. The signal output by the first and second outputs 24, 26 of the variable amplifier 22 drives a current source 28. In this embodiment, the current source 28 is an N-type metal-oxide-semiconductor field-effect transistor (NMOS) device. However, one skilled in the field of circuit design will appreciate that a bipolar (junction) transistor current source device could alternatively be used.

A first output 30 from the current source 28 is connected to a negative terminal 32 of a power supply (not shown), via a resistor 34. A second output 36 of the current source 28 is connected to a positive terminal 38 of the power supply (not shown), via a load inductor 40. The second output 36 of the current source 28 is also connected, via a node 42, to the antenna 12, via circuitry which will now be discussed.

A capacitor 44 is connected in series with a resistor 46 between the node 42 and the first end 14 of the antenna 12. A capacitor 48 is connected in parallel with the antenna 12, between the capacitor 44 and the resistor 46. A resistor 50 is connected between the capacitor 48 and the second end 16 of the antenna 12. A node 52 is provided between the capacitor 48 and the resistor 50. Two further capacitors 54 and 56 are connected between the node 52 and a node 58 which, itself, is located between the node 42 and the capacitor 44. The capacitor 56 is a shunt capacitor which can be used to tune the antenna 12.

A node 58' located between the capacitor 54 and the capacitor 56 forms a point of connection to a second part (not shown) of the circuit 100, which will be discussed in connection with FIG. 2.

The second output 36 of the current source 28 is also connected to the variable amplifier 22 via a feedback loop which will now be described in greater detail. The feedback loop is connected between the output 36 of the current source 28 and the load inductor 40 at a node 60. An attenuator 62 and a diode 64 are connected in series between the node 60 and an inverting input 66 of an operational amplifier 70. An RF level indicator 71 provides a DC indication of the voltage of the signal at the node 42, and forms the inverting input 66 of the operational amplifier 70. The RF level indicator 71 is also capable of tracking the AM component of the signal 18, and can function as an AM output in a manner known to those skilled in the art. A node 65 positioned between the diode 64 and the inverting input 66 of the operational amplifier 70 is connected to ground 67 via a reservoir capacitor 69. In an alternative embodiment, the system can be connected to a polar receiving system, which allows the system to function on amplitude and phase independently. In that alternative embodiment, for optimum performance, those skilled in the art will appreciate that there is a need to recover the phase of the received signal as well as the amplitude.

A threshold reference 72 (a DC signal) is input into the operational amplifier 70 via a non-inverting input 68. The purpose of the threshold reference 72 will be discussed with reference to FIG. 2. An output 74 of the operational amplifier 70 is input into the variable amplifier 22. The output 74 of the operational amplifier 70 determines the amount by which the signal 18 is amplified.

Figure 2:
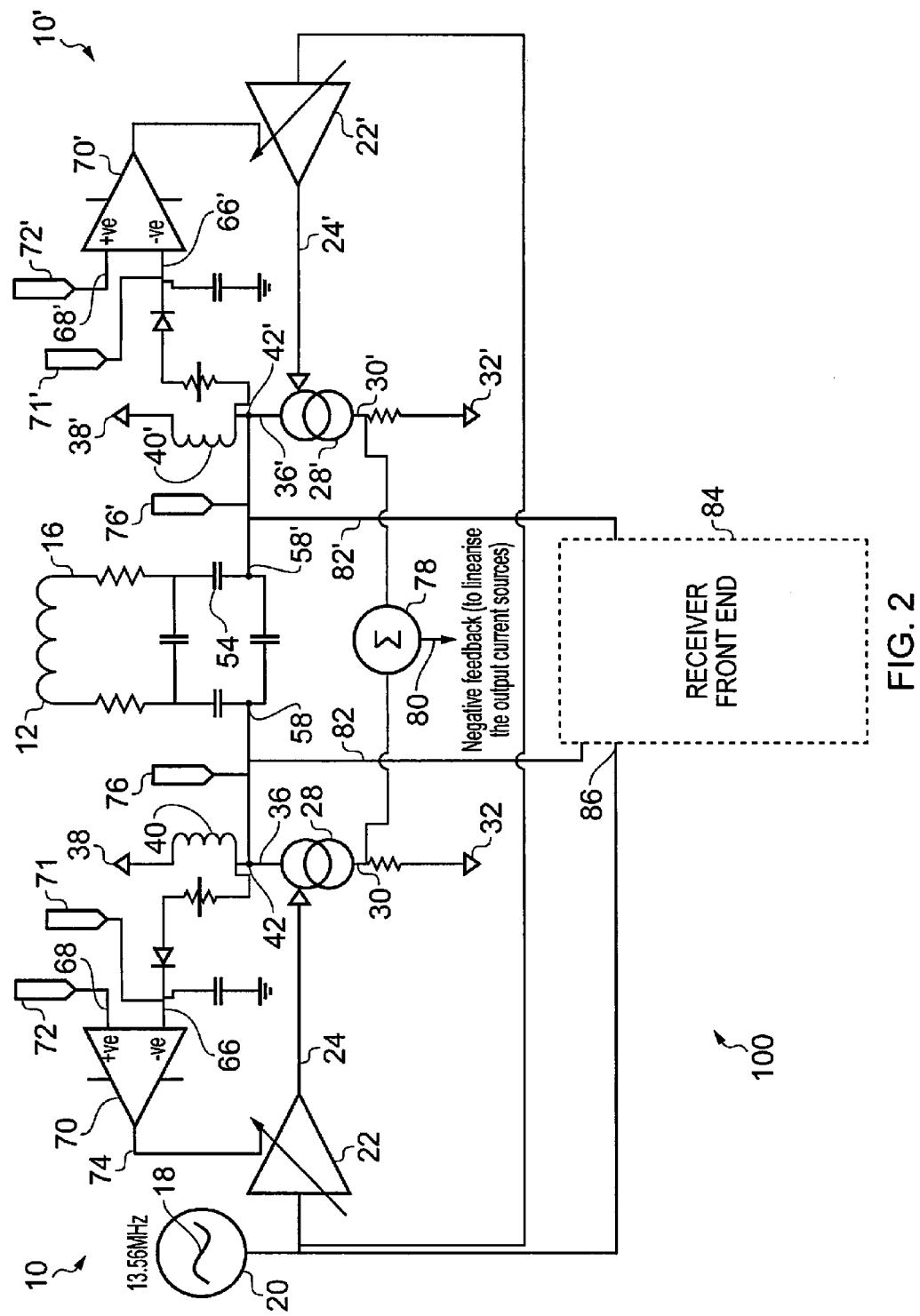
FIG. 2 is a circuit diagram showing a circuit having an antenna and two NFC drivers.

Turning to FIG. 2, it will be apparent that the circuit 10 shown in FIG. 1 forms the left-hand side 10 of the larger circuit 100 of FIG. 2. The right-hand side 10' of the circuit 100 is effectively the circuit 10 of FIG. 1 mirrored about the antenna 12. Features of the left-hand side 10 of the circuit 100 in FIG. 2 are provided with reference numerals matching those used in FIG. 1. Features of the right-hand side 10' of the circuit 100 are provided with apostrophised reference numerals corresponding to those used in the left-hand side 10 of the circuit 100 and in FIG. 1. In other words, the general reference numeral given to the right-hand side of the circuit 100 is 10', the variable amplifier in the right-hand side of the circuit 100 is given the reference numeral 22', and so on.

The signal 18 generated by the signal generator 20, is input into the variable amplifier 22' as well as the variable amplifier 22.

Referring particularly to the right-hand side 10' of the circuit 100 of FIG. 2, a second output 36' from a current source 28' is connected to a positive terminal 38' of a power supply (not shown) via a load inductor 40'. The second output 36' from the current source 28' is also connected to the second end 16 of the antenna 12 via a node 42' between the current source 28' and the load inductor 40'. The connection between the node 42' and the second end 16 of the antenna 12 is connected via a node 58', positioned between the capacitor 54 and the capacitor 56.

A first RF output 76 and a second RF output 76' are connected to the nodes 58 and 58' respectively, either side of the antenna 12. The RF outputs 76, 76' are used by the device 100 in receive mode. Briefly, in receive mode, the signal 18 is not modulated with data. Instead, the signal 18 a continuous wave signal and, using the signal 18, the antenna 12 emits a generally continuous RF field having a frequency of 13.56 MHz. When a target (such as an NFC tag in a billboard or poster) interrupts the field, the field emitted by the antenna 12 powers the target, the target's presence is detected by the RF outputs 76, 76', and an exchange of data between the target and the receiver 100 takes place. This data transfer mechanism is known as load modulation. The target switches the impedance it presents to the initiator (the mobile phone's NFC receiver in this example) at a frequency of 847 KHz (that is 13.56 MHz/16). The 847 KHz switching signal is then modulated with the data that the target is sending to the mobile phone's NFC receiver. The data is received by the RF outputs 76, 76' and input, via connections 82, 82', into receiver front end circuitry 84 where it is processed. The receiver front-end circuitry 84 will not be discussed in detail, but will be familiar to a person skilled in the relevant field. The signal 18 is also input into the receiver front-end circuitry 84 via input 86.

The first outputs 30, 30' from the respective current sources 28, 28' are summed in a summation unit 78. An output 80 of the summation unit 78 is used in a negative feedback loop (not shown) to linearise the output current sources, in a manner that will be familiar to those skilled in the art.

The operation of the NFC driver 100 will now be described.

As indicated above, the NFC driver 100 includes the two parts 10, 10' of the circuit, which are substantially identical, and mirrored about the antenna 12.

A carrier signal 18, having a frequency of 13.56 MHz is generated by the signal generator 20, and input into the variable amplifiers 22 and 22'. The driver 100 is configured such that the variable amplifiers 22, 22' operate 180 degrees out of phase with one another with respect to the carrier signal. In other words, the variable amplifier 22 outputs a drive signal 24 which is 180 degrees out of phase with the drive signal 24' output by the variable amplifier 22'. Thus, the variable amplifiers 22, 22' operate in a "push-pull" configuration. The signals input into each of the variable amplifiers need to be out of phase with one another to ensure that a balanced system is maintained. Considering, first, the circuit 10, the drive signal 24 drives the current source 28. The current source 28 powers the antenna 12 with its output 36. The output 36 from the current source 28 is also input into the inverting input 66 of the operational amplifier 70. The non-inverting input 68 of the operational amplifier 70 receives a threshold reference input 72. The operational amplifier 70 compares the inverting input 66 with the threshold reference input 72 and, if the inverting input is greater than the threshold reference input, then the signal 74 output by the operational amplifier acts to adjust the variable amplifier 22 so as to attenuate the drive signal 24. Thus, the output 36 from the current source 28 is kept below the threshold reference 72.

In addition to delivering the carrier signal 18 to the antenna 12, the output 36 from the current source is also input into the load inductor 40. The load inductor 40 is charged by the output 36 from the current source 28.

Although a signal 18 is provided to both of the current sources 28, 28', only one of the current sources operates at any one time. In other words, for a first predetermined duration, the carrier signal 18 drives the variable amplifier 22 in the left hand side 10 of the circuit. After the first predetermined duration, the signal 18 drives the variable amplifier 22' in the right hand side 10' of the circuit for a second predetermined duration. The first and second predetermined durations are preferably substantially the same.

Thus, during the second predetermined duration, an output 24' from the variable amplifier 22' drives the current source 28' which, in turn outputs current via an output 36' to the antenna 12, to an inverting input 66' of an operational amplifier 70', and to a load inductor 40'.

During the second predetermined duration, the output 36 stops providing power to the antenna 12, and stops charging the load inductor 40. Instead, the load inductor 40 begins to discharge its stored current, which is input into the antenna 12, and through the current source 28', to a terminal of the power supply 32'. After the second predetermined duration, the current source 28 on the left hand circuit 10 again generates an output 36, and so on. Each predetermined duration referred to above is a single half-cycle of the 13.56 MHz signal.

To understand the effect of the circuit 100, it is useful to consider an example. The current supplied to the antenna 12 from each of the load inductors 40, 40' will, at its maximum, be approximately equal to the current supplied by the current sources 28, 28'. For example, if the power supplied to each current source by respective power supplies 32, 38 and 32', 38' gives rise to a current output I from outputs 36, 36', then the current I will be supplied to the antenna 12 and to each of the load inductors 40, 40'. This gives rise to a voltage V across the nodes 42, 42' and 58, 58'. When the load inductors 40, 40' are fully charged, they will each store a current I and, when each load inductor discharges, it will supply a maximum current I to the antenna. It is important to ensure that the discharging load inductors 40, 40' do not cause the voltages across nodes 58 and 58' to increase beyond 2V. If the voltage does increase beyond 2V, there is a risk that components within the circuit will be damaged. Furthermore, a large increase in voltage can cause interference or distortion over a range of frequencies emitted by the antenna 12. The voltage V is approximately equal to a supply voltage $V_{dd}$ (that is the voltage supplied by the power supply 32, 32', 38, 38') minus the voltage used by the current source 28, 28'. The supply voltage $V_{dd}$ is the voltage of the battery (3.6 v), and the voltage used by the current source is approximately 0.5 v, so V=3.1 v. The invention is, therefore, arranged to adjust the variable amplifier 22 so that the voltage across the nodes 58 and 58' does not exceed a maximum voltage, $V_{max}=V_{dd}+V$ (=3.6 v+3.1 v=6.7 v). If the voltage across the nodes 58 and 58' increases beyond $V_{max}$ (6.7 v in this example) by a small amount then, initially, the transmitted signals from the antenna 12 will experience increased distortion. This could lead to regulatory failure of the transmission mask. If the distortion is significant, then the target may fail to receive the data transmitted in the signal.

If the voltage across the nodes 58 and 58' increases significantly beyond $V_{max}$, the driver is likely to fail, and there becomes a significant risk of irreparable damage occurring to the receiver.

So far, the invention has been described in terms of individual embodiments. However, one skilled in the art will appreciate that various embodiments of the invention, or features from one or more embodiments, may be combined as required. It will be appreciated that various modifications may be made to these embodiments without departing from the scope of the invention, which is defined by the appended claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A transmitter for transmitting signals in a near-field communication (NFC) frequency band, the transmitter comprising:
   an antenna;
   a first current source for generating a first current to excite the antenna;
   a first detector for detecting a first voltage at an output of the first current source; and
   circuitry for reducing the current output by the first current source if the detected first voltage exceeds a first predefined threshold, wherein the circuitry for reducing the first current output by the first current source comprises a variable amplifier.

2. A transmitter according to claim 1, wherein the first detector comprises an attenuator and a diode.

3. A transmitter according to claim 1, further comprising a first load inductor arranged to be charged by the first current output from the first current source and to discharge its stored current into the antenna.

4. A transmitter according to claim 1, wherein the first predefined threshold is approximately 2V, where V is the voltage at the output of the first current source.

5. A transmitter according to claim 1, further comprising:
   a second current source for generating a second current to excite the antenna;
   a second detector for detecting a second voltage at an output of the second current source; and
   circuitry for reducing the second current output by the second current source if the detected second voltage exceeds said second predefined threshold.

6. A transmitter according to claim 5, wherein the first current is substantially equal to the second current.

7. A transmitter according to claim 5, wherein the first voltage is substantially equal to the second voltage.

8. A transmitter according to claim 5, wherein the first predefined threshold is substantially equal to the second predefined threshold.

9. A transmitter according to claim 5, wherein the first current source supplies the first current for a first predetermined duration, and second current source supplied the second current for a second predetermined duration.

10. A transmitter according to claim 9, wherein the first and second predetermined durations are substantially the same.

11. A transmitter according to claim 10, wherein the first and second current sources operate alternately.

12. A transmitter according to claim 5, further comprising a second load inductor arranged to be charged by the second current output from the second current source.

13. A transmitter according to claim 12, wherein the second load inductor is arranged to discharge its stored current into the antenna.

14. A transmitter according to claim 5, wherein the second predefined threshold is approximately 2V, where V is the voltage at the output of the second current source.

15. A transmitter according to claim 5, wherein the first and second currents supplied by the first and second current sources are supplied on alternate half-cycles of a signal to be transmitted by the transmitter.

16. An integrated circuit comprising:
   a transmitter for transmitting signals in a near-field communication (NFC) frequency band, the transmitter comprising:
   a first current source for generating a first current to excite an antenna;
   a first detector for detecting a first voltage at an output of the first current source; and
   circuitry for reducing the current output by the first current source if the detected first voltage exceeds a first predefined threshold, wherein the circuitry for reducing the first current output by the first current source comprises a variable amplifier.

17. A transmitter for transmitting signals in a near-field communication (NFC) frequency band, the transmitter comprising:
   an antenna;
   a first current source for generating a first current to excite the antenna;
   a first detector for detecting a first voltage at an output of the first current source; and
   circuitry for reducing the current output by the first current source if the detected first voltage exceeds a first predefined threshold, wherein the transmitter further comprises a first load inductor arranged to be charged by the first current output from the first current source and to discharge its stored current into the antenna.

18. A transmitter for transmitting signals in a near-field communication (NFC) frequency band, the transmitter comprising:
   an antenna;
   a first current source for generating a first current to excite the antenna;
   a first detector for detecting a first voltage at an output of the first current source; and
   circuitry for reducing the current output by the first current source if the detected first voltage exceeds a first predefined threshold, wherein the transmitter further comprises:
      a second current source for generating a second current to excite the antenna;
      a second detector for detecting a second voltage at an output of the second current source; and
      circuitry for reducing the second current output by the second current source if the detected second voltage exceeds said second predefined threshold.

* * * * *